United States Patent Office 3,518,357
Patented June 30, 1970

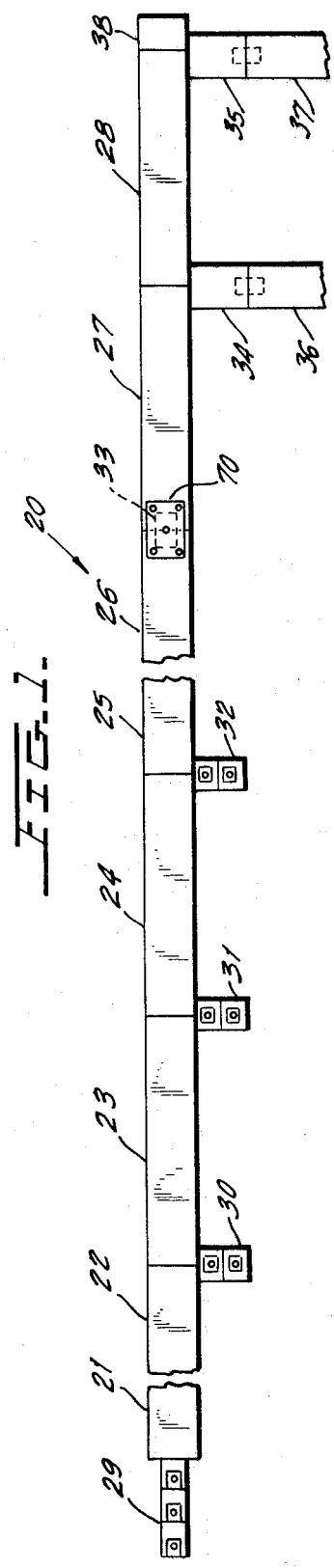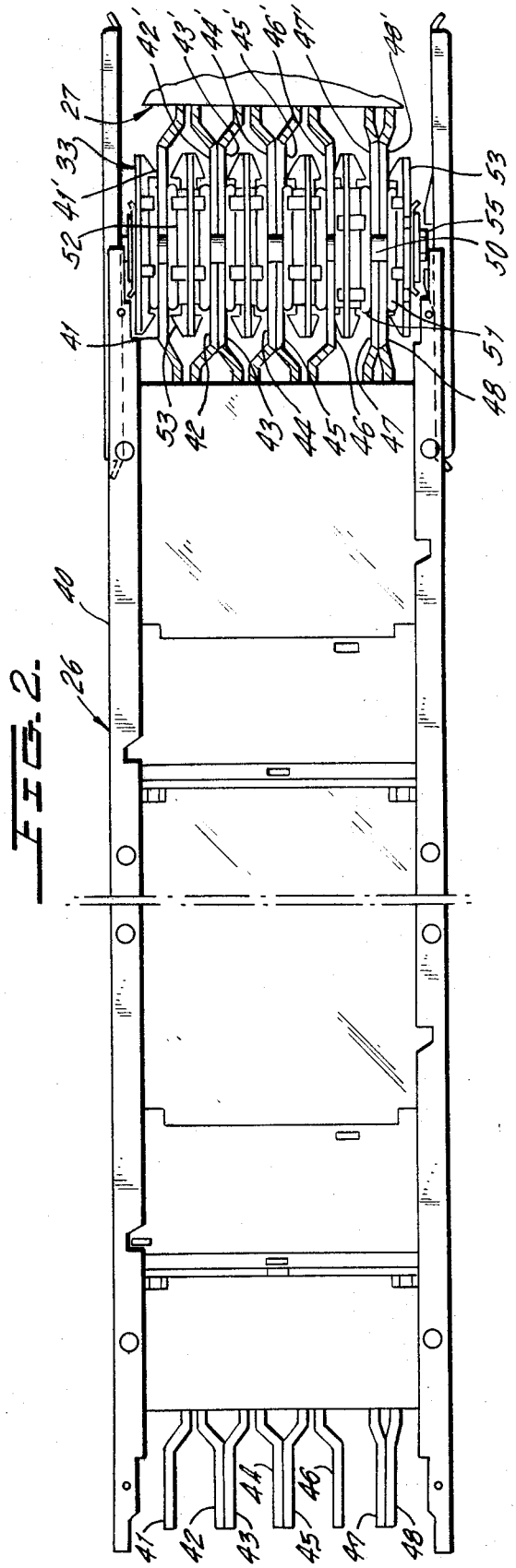

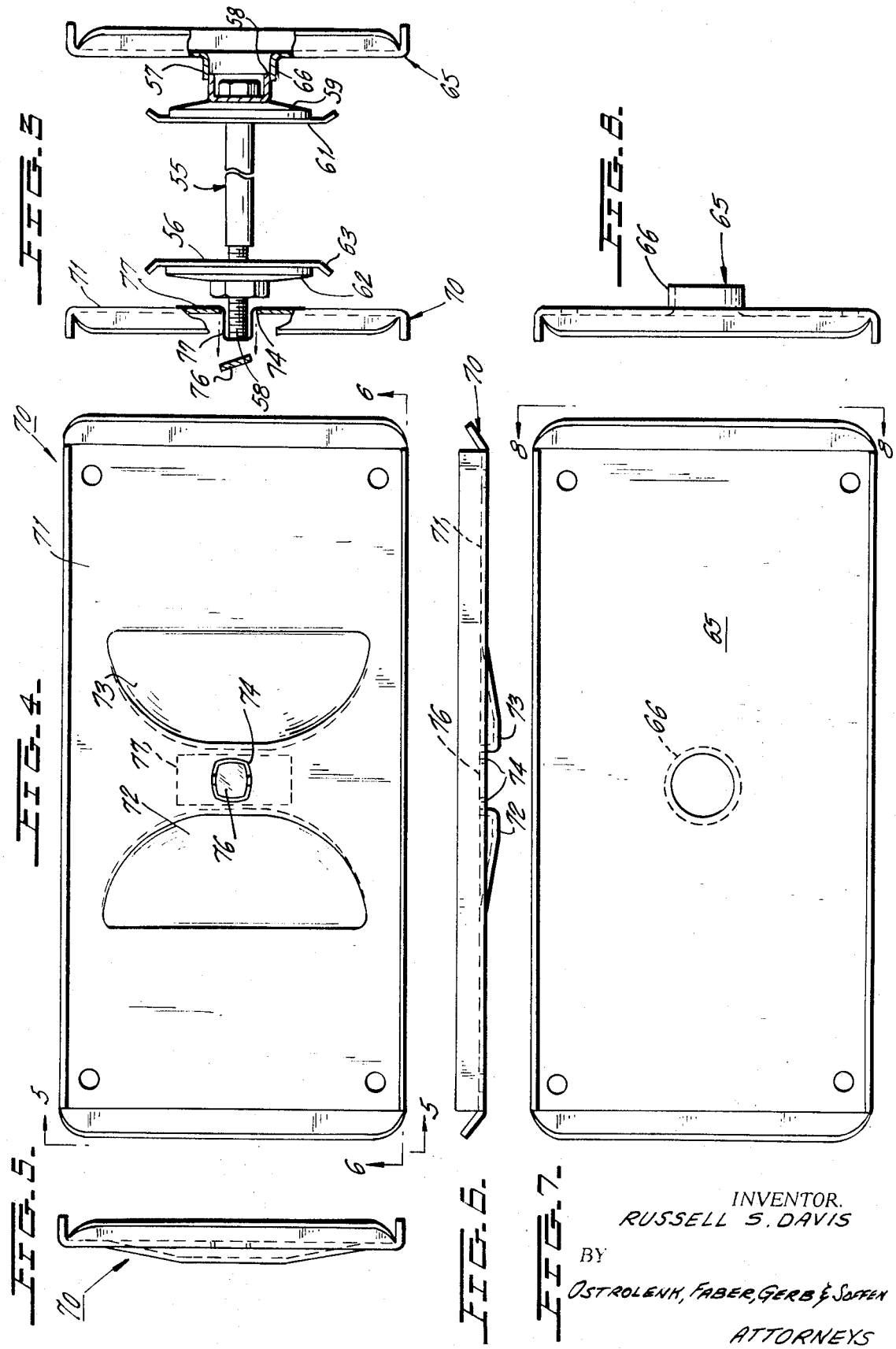

3,518,357
INDICATOR FOR BUS DUCT JOINT
Russell S. Davis, Detroit, Mich., assignor to I-T-E Imperial Corporation, Philadelphia, Pa., a corporation of Delaware
Filed Aug. 4, 1969, Ser. No. 847,313
Int. Cl. H02g 5/04
U.S. Cl. 174—88
10 Claims

ABSTRACT OF THE DISCLOSURE

The cover for a bus duct housing at a joint region thereof is provided with an aperture aligned with the joint clamping bolt and positioned opposite the free end thereof. As the bolt is being tightened for the application of pressure to the electrical connections between bus bars at the joint region, the bolt forces a plastic or steel insert closing the aperture outward and at the same time a deformable plastic tape covering the aperture is deformed by the bolt so that the tape is forced outside the housing. The tape is of a color that contrasts sharply with the color of the bus duct housing to provide a visual indication that the joint has been tightened.

---

This invention relates to bus duct in general and more particularly relates to an indicator means for readily observing that bus duct joints have or have not been tightened.

My U.S. Pat. 3,339,009, entitled "Bus Duct With Removal Joint Stack," illustrates a bus duct run in which a joint stack, including a plurality of splice plates and a single through bolt, is used to effect the electrical connections between corresponding bus bars of adjacent duct sections. Unfortunately, it appears that when installing bus duct workmen inadvertently forget to tighten the electrical joint connections. Since the clamping through bolt is for the most part concealed within the duct housing an untightened or very loose joint is not readily detactable. Failure to properly tighten the joint results in rapid deterioration and other undesirable conditions.

In order to alleviate this condition the instant invention includes means for providing a convenient visual indication that a bus duct joint has been tightened. In particular the indicating means of the instant invention, as will hereinafter be described, is actuated by the joint clamping bolt when the latter is moved to a position in which a predetermined minimum clamping force is present at the joint. At this time the indicator means provides a bright or contrasting color display observable externally of the duct housing.

Accordingly a primary object of the instant invention is to provide a novel means for indicating that a bus duct joint has been tightened.

Another object is to provide an indicator means of this type in which there is a bright or contrasting color display viewable when the joint is tightened.

Still another object is to provide an indicating means of this type in which there is a housing means aperture cover that is automatically removed by the clamping bolt when the latter is operated to provide clamping pressure at the duct joint.

A still further object is to provide an indicating means of this type in which tightening of the clamping bolt removes an insert or knock-out from a bus duct joint cover plate and projects a bright color element externally of the housing.

These objects as well as other objects of this invention will become readily apparent after reading the following description of the accompanying drawings in which:

FIG. 1 is a fragmentary plan view in schematic form showing a bus duct electrical distribution system including an indicator means constructed in accordance with the teachings of the instant invention.

FIG. 2 is a side elevation of some of the duct sections of the system of FIG. 1.

FIG. 3 is a side elevation showing the joint elements required to operate the indicating means of the instant invention.

FIG. 4 is a front elevation of the housing cover plate and the cover plate mounted elements constituting the instant invention.

FIGS. 5 and 6 are end views of the cover plate of FIG. 4 looking in the direction of the respective arrows 5—5 and 6—6 of FIG. 4.

FIG. 7 is a front elevation of a joint cover plate positioned opposite the cover plate of FIG. 4.

FIG. 8 is an end view of the cover plate of FIG. 7 looking in the direction of arrows 8—8.

Now referring to the figures. As explained in detail in the aforesaid U.S. Pat. 3,339,009, electric distribution system 20 of FIG. 1 includes a plurality of bus duct sections 21—28, and intermediate sections (not shown) connected in a straight run. Power tap section 29 is connected at the left-end of section 21 while power tap section 30 is at the joint between sections 22 and 23. Power tap section 31 is at the joint between duct sections 23 and 24 and power tap section 32 is at the joint between sections 24 and 25. Removable joint stack 33 electrically connects duct sections 26 and 27; junction forming section 34 connects duct sections 27 and 28 in a T-arrangement with duct section 36, while junction forming section 35 at the right end of duct section 28 connects this latter duct section to duct section 37 to form an L-arrangement. Adapter 38 provides a closure for the right end of duct section 28 and provides spacing members (not shown) for the electrical joint means.

Briefly, each of the duct sections 21 through 28, 36 and 37 is of identical construction, including elongated housing 40 of generally rectangular cross section wherein eight elongated flat bus bars 41–48 are disposed in a ladder type arrangement. This arrangement is also a so-called paired-phase, low impedance configuration, the principles of which are explained in U.S. Pat. No. 2,287,-502, issued June 23, 1942, to A. A. Torgesen et al., entitled "Electrical Distribution System."

As seen in FIG. 2, the bus bars of duct section 27 that are positioned in axial alignment with the bus bars of duct section 26 are given the same reference numerals with the addition of a prime (') suffix notation.

With the housings of duct sections 26 and 27 mounted such that the ends thereof are in abutting relationship, the ends of the bus bars of duct section 26 are spaced from the ends of the bus bars of duct section 27, to provide a gap into which insulating tube 50 of joint stack 33 is movable in a direction transverse to the longitudinal axis of duct sections 26 and 27 in a plane parallel to the planes in which the faces of the bus bars lie.

In addition to insulating tube 50, joint stack 33 includes a plurality of splice plates 51 constructed of electrical conducting material and a plurality of insulator blocks 53 as well as clamping bolt 55 which extends through tube 50 and is threadably engaged by nut 56. Bolt head 57 is disposed within cup 58, spring washer 59 is mounted to bolt 55 being sandwiched between head 57 and flat washer 51. Another spring washer 62, mounted to bolt 55, is sandwiched between nut 56 and flat washer 63. Spring washers 59, 62 are provided to maintain sufficient contact pressure within joint stack 33 to effect good electrical contact between bus bars 41–48, 41'–48' and splice plate 51. As is well known in the art, loading of spring washers 59, 62 causes flattening thereof from their normal convex conditions.

In the joint region or region of joint stack 33, the ends of adjacent housings 40 are cut away forming openings to facilitate the insertion of stack 33. Four covers, only two of which 65, 70 (FIGS. 7 and 4 respectively) are shown, provide closures for the joint region openings in the duct housings.

Cover 65 is a generally flat rectangular member outwardly turned along its edges to rigidify the member. Annular lip 66 extends inwardly and surrounds a central opening in cover 65. As seen in FIG. 3, cup 58 surrounding bolt head 57 is relatively closely fitted within annular lip 66.

Cover 70 is also a rectangular relatively flat member 71 having outwardly turned flanges along the edges thereof. The inner surface of cover 70 is provided with inward embossments 72, 73 which position and maintain nut 56 against rotation. At the center of cover 70, and between embossments 72 and 73, is aperture 74 which is large enough to permit the threaded portion of bolt 55 to extend therethrough. Before cover 70 is installed in a new bus duct run hole 74 is closed or plugged by cover 76, which is either cemented to member 71 or is formed as a knock-out therein. Disposed behind cover 76 and cemented to member 71 is a strip of deformable resilient tape 77. For a reason to be hereinafter explained the color of tape 77 contrasts sharply with the color of cover 70 and the remainder of housing 40. Typically housing 40 and cover 70 are light gray (ASA 61), while tape 77 is a bright orange or bright red.

When bus duct run 20 of FIG. 1 is being assembled, the duct section housings are placed end to end and the joint stacks for making electrical connections between adjacent duct sections are slipped into place and nut 56 is hand-tightened on bolt 55. At this time spring washers 59, 62 are unloaded so that they are in their fully bowed expanded condition and as a result bolt 55 is positioned considerably to the right of the position bolt 55 occupies in FIG. 3. In this position for bolt 55, tip 58 at the threaded end thereof is disposed so as not to project through opening 74 when cover 70 is installed.

Thereafter joint stack 33 is tightened by using a socket wrench which engages bolt head 57. As bolt 55 is tightened, since the positions of the duct bus bars are essentially fixed, bolt tip 58 moves toward cover 70 engaging tape 77 and separating cover 76 from member 71. By the time bolt 55 is tightened to a point where spring washers 59, 62 exert a predetermined contact force within joint stack 33, bolt tip 58 projects through hole 74 carrying with it the central portion of tape 77 and completely separating cover 76 from member 71.

Thus, the presence of brightly colored tape 77 protruding through cover opening 74 indicates that bolt 55 has been tightened to a point where there is sufficient contact pressure within the joint stack 33. This provides a convenient visual indication to tell the installer whether the joint has been tightened without the necessity of opening the joint covers. Since plastic tape 77 has a memory, in the event the joint should become loose, tape 77 will recover to its normal position so that a man inspecting the joints can readily see whether tape 77 is flush or returned to its original retracted position. This will enable him to take immediate corrective steps before serious damage occurs to the bus system.

It is thus seen that the instant invention provides novel simplified means for readily obtaining a visual indication of whether or not a bus duct joint has been and is tightened.

Although there has been described a preferred embodiment of this novel invention, many variations and modifications will now be apparent to those skilled in the art. Therefore, this invention is to be limited, not by the specific disclosure herein, but only by the appending claims.

The embodiments of the invention in which an exclusive privilege or property is claimed are defined as follows:

1. A bus duct run including elongated housing means and a plurality of elongated bus bars disposed within said housing means in stacked relationship and extending generally parallel to the longitudinal axis of said housing means; means maintaining each of said bus bars insulated from adjacent ones of said bus bars for substantially their entire lengths; said run comprising a plurality of sections electrically and mechanically together at a plurality of joint regions; a first and a second of said plurality of sections being electrically and mechanically connected to each other at a first of said plurality of joint regions; joint means applying clamping force to electrically connect corresponding bus bars of said first and said second section at said first joint region; said joint means including a transverse bolt means for applying said clamping force; indicator means actuated by said bolt means upon tightening thereof to visually indicate that said joint means is exerting predetermined clamping force urging contacting bus bars of said duct sections into electrical engagement.

2. A bus duct run as set forth in claim 1 in which said indicator means includes a portion displaceable outward of said housing means by said bolt means upon tightening thereof.

3. A bus duct run as set forth in claim 2 in which said portion includes a removable element closing an aperture in said housing means when said bolt means is in a relatively loose condition.

4. A bus duct run as set forth in claim 3 in which there is a head at one end of said bolt means; said aperture is aligned with said bolt means and positioned adjacent the other end thereof.

5. A bus duct run as set forth in claim 4 in which said housing means includes a removable cover at said first joint region; said aperture extending through said cover.

6. A bus duct run as set forth in claim 2 in which said portion and said housing means are of contrasting colors.

7. A bus duct run as set forth in claim 2 in which said portion includes a deformable member displaceable outward of said housing means by said bolt means upon tightening thereof.

8. A bus duct run as set forth in claim 7 in which said member is resilient and is of a color which contrasts with the color of said housing means.

9. A bus duct run as set forth in claim 8 in which there is a removable element closing said aperture when said bolt means is in a relatively loose condition; said member positioned inboard of said element.

10. A bus duct as set forth in claim 9 in which said housing means includes a removable cover at said first joint region; said aperture extending through said cover; said member being sheet-like and covering said aperture.

References Cited

UNITED STATES PATENTS 3,113,553  12/1963  Schinske _____ 174—87 XR

DARRELL L. CLAY, Primary Examiner

U.S. Cl. X.R.

116—114; 174—99